(12) United States Patent
Rößl

(10) Patent No.: US 11,047,948 B2
(45) Date of Patent: Jun. 29, 2021

(54) METHOD FOR LOCATING A RADIO TAG

(71) Applicant: IMAGOTAG GMBH, Graz (AT)

(72) Inventor: Andreas Rößl, Graz (AT)

(73) Assignee: SES-IMAGOTAG GMBH, Fernitz-Mellach (AT)

( * ) Notice: Subject to any disclaimer, the term of this patent is extended or adjusted under 35 U.S.C. 154(b) by 0 days.

(21) Appl. No.: 16/773,256

(22) Filed: Jan. 27, 2020

(65) Prior Publication Data

US 2020/0158811 A1 May 21, 2020

Related U.S. Application Data

(62) Division of application No. 15/309,482, filed as application No. PCT/EP2014/059824 on May 14, 2014, now Pat. No. 10,585,161.

(51) Int. Cl.
| | |
|---|---|
| *G01S 5/02* | (2010.01) |
| *G01S 5/10* | (2006.01) |
| *G08B 21/24* | (2006.01) |
| *G08B 21/02* | (2006.01) |

(52) U.S. Cl.
CPC .............. *G01S 5/0252* (2013.01); *G01S 5/02* (2013.01); *G01S 5/0226* (2013.01); *G01S 5/0294* (2013.01); *G01S 5/10* (2013.01); *G08B 21/0272* (2013.01); *G08B 21/24* (2013.01)

(58) Field of Classification Search
CPC ........ G01S 5/02; G01S 5/0252; G01S 5/0226; G01S 5/0294; G01S 5/10; G08B 21/0272; G08B 21/24
USPC ......................................................... 455/41.2
See application file for complete search history.

(56) References Cited

U.S. PATENT DOCUMENTS

| | | | |
|---|---|---|---|
| 10,585,161 B2 * | 3/2020 | Ro | ........................ G01S 5/0252 |
| 2010/0156624 A1 | 6/2010 | Hounsell | |
| 2014/0183261 A1 | 7/2014 | Ung et al. | |

FOREIGN PATENT DOCUMENTS

| | | |
|---|---|---|
| WO | 2007070103 | 6/2007 |
| WO | 2010137883 A2 | 12/2010 |
| WO | 2013007089 A1 | 1/2013 |
| WO | 2014030009 A1 | 2/2014 |

OTHER PUBLICATIONS

International Search Report issued in connection with PCT/EP2014/059824 dated Feb. 12, 2015.

* cited by examiner

*Primary Examiner* — Lee Nguyen
(74) *Attorney, Agent, or Firm* — Dennemeyer & Associates, LLC

(57) ABSTRACT

The invention further relates to a radio tag with a communication stage and a logic stage that interacts therewith The invention relates to a method for locating a radio tag whose position is unknown, wherein in a group of radio tags, in particular designed as electronic price-indicating devices, a locating signal is either a) emitted by one or more radio tags whose position is known and received by the radio tag whose position is unknown or b) emitted by the radio tag whose position is unknown and received by one or more radio tags whose position is known, and, in both cases a) and b), the reception quality for the locating signal is determined and provided, for the radio tag receiving the locating signal, as a basis for narrowing down the position of the radio tag whose position is unknown.

19 Claims, 6 Drawing Sheets

| $K_n$ | RSSI |
|---|---|
| K1 | -100 |
| K2 | -95 |
| K3 | -90 |
| K4 | -60 |
| K5 | -50 |
| K6 | -40 |
| ⋮ | ⋮ |
| K10 | -55 |
| K11 | -45 |
| K12 | -20 |
| K16 | -70 |
| K18 | -40 |

METHOD FOR LOCATING A RADIO TAG

CROSS-REFERENCE TO RELATED APPLICATIONS

This is a divisional application of U.S. patent application Ser. No. 15/309,482 filed Nov. 8, 2016, which is a 35 U.S.C. 371 National Stage Patent Application of International Application No. PCT/EP2014/059824, filed May 14, 2014, each of which is hereby incorporated by reference in its entirety.

TECHNICAL FIELD

The invention relates to a method for locating a radio tag.

The invention further relates to a radio tag with a communication stage and a logic stage that interacts therewith.

The invention further relates to a system for locating a radio tag.

BACKGROUND

Conventional systems and methods for locating a device designed to receive and/or transmit radio signals are mostly based on triangulation or runtime measurement methods. However, for a wide variety of reasons, such methods have proven to be disadvantageous when used inside a building or room, and only have limited application, if any. Since any interior space, in particular each business premises, is unique and in itself exhibits a high level of inhomogeneity with respect to radio signal propagation, position determination, for example via triangulation, using several fixedly installed access points has proven to be inexpedient.

The object of the invention is to provide a method, a radio tag, as well as a system, so as to avoid the problems mentioned at the outset.

SUMMARY OF THE INVENTION

The subject matter of the invention relates to a method for locating a radio tag whose position is unknown, wherein in a group of radio tags, in particular designed as electronic price-indicating devices, a locating signal is either a) transmitted by one or more radio tags whose position is known and received by the radio tag whose position is unknown, or b) transmitted by the radio tag whose position is unknown and received by one or more radio tags whose position is known, and, in both cases a) and b), the reception quality of the locating signal is determined and provided at the radio tag receiving the locating signal in order to narrow down the position of the radio tag whose position is unknown.

The subject matter of the invention further relates to a radio tag with a radio communication stage for receiving a locating signal transmitted by another radio tag and a logic stage that interacts with the radio communication stage, wherein the logic stage is designed to enable reception of the locating signal as soon as the other radio tag transmits the locating signal, and wherein the radio tag (Tn) is designed to evaluate the received locating signal with respect to the reception quality of the locating signal and to provide the determined reception quality for narrowing down the position of a radio tag whose position is unknown.

The subject matter of the invention further relates to a system for locating a radio tag whose position is unknown, comprising a group of radio tags, wherein either a) one or more radio tags whose position is known are designed to transmit a locating signal and the radio tag whose position is unknown is designed so that the locating signal can be received as soon as the radio tag(s) whose position is known has/have transmitted it, or b) the radio tag whose position is unknown is designed to transmit a locating signal, and one or more radio tag(s) whose position is known are designed so that the locating signal can be received as soon as the radio tag whose position is unknown has transmitted it, and in both cases a) and b), the radio tag that receives the locating signal is designed to evaluate the locating signal with respect to the reception quality of the locating signal and to provide the determined reception quality.

The provided reception quality can be used to narrow down or even determine the position of the radio tag whose position is unknown. Only a single access point is here necessary, to which the tags involved in the search are allocated by radio. If a system consists of several access points and tags individually allocated thereto, these access points and the tags allocated thereto can uninterruptedly handle a normal communication operation, while only a single access point with the tags allocated thereto is involved in the search for the tag also allocated and to be allocated thereto. This minimizes interference in overall system performance.

A radio tag (generally also referred to as "radio label"), hereinafter abbreviated to tag, essentially comprises a radio communication stage, also called a transceiver, and a logic stage that interacts therewith, which provides the logical function of a tag. For example, the logic stage can be realized completely by hardware, or exhibit a microprocessor and memory chips or a microcontroller with integrated memory chips, making it possible to run software stored in the memory chips. A tag can receive a radio signal with its radio communication stage, process the reception data contained in the radio signal with the logic stage, and, if needed, generate response data with the logic stage and transmit them again as a radio signal via the radio communication stage. The radio communication stage exhibits means for radio communication and the conversion of analog signals into digital signals and vice versa.

For example, the radio protocol can be implemented according to the "ZigBee" standard, the "BlueTooth" standard or even according to a proprietary protocol. The logic stage implements the radio protocol, so that communication can be carried out between the tag and access point based on the systematics and timing of the radio protocol.

For example, such a tag can be integrated into an electronic price-indicating sign (known in the jargon as "electronic shelf label", abbreviated as ESL). However, the tag can also be a constituent of another device, or present as a self-contained device, for example encapsulated in its own housing.

In a preferred exemplary embodiment, use is made of a proprietary radio protocol that implements a time slot communication method, by means of which several tags can communicate with an access point. An access point (generally also referred to as "communication device") is a base station that serves as an interface between wired communication, e.g., with a data processing device (e.g., a server), and wireless communication with other devices, in the present case the tag. According to this protocol, the tags can first be registered at the access point or be allocated thereto, so that they can be used for communicating with this access point. During registration, each tag has assigned to it a predefined, individual time slot for communicating with the access point. For example, within a period of n seconds, e.g., 15 seconds, m time slots, e.g., 255 time slots, are here used. The n seconds constitute a time slot cycle, which continuously repeats and is also referred to as a synchronization cycle. In this time slot communication process, m time slots are thus available within a synchronization cycle for communicating with tags. Each of the tags is allocated to one of the time slots, wherein a specific time slot can also have several tags allocated to it, e.g., 2, 3 or 4 tags. Four synchronization cycles each with 255 time slots exist within one minute, so that, for example, 2 tags per time slot can be used to address a total number of 2040 tags.

For purposes of energy supply, such a radio tag can comprise an energy storage device, e.g., a battery or a solar panel coupled with a rechargeable battery. To operate as energy efficiently as possible, the tags exhibit various operating states.

The tags are operated in a normal mode. In this normal mode, they are either in an active state with a relatively high energy consumption, or in a sleep state with relatively low energy consumption. The active state is present in a time slot intended for it for communicating with the access point. In the active state, it exhibits a reception readiness so as to receive commands and potentially also received data from the access point, and process the latter via the logic stage. In the active state, the logic stage can also be used to generate transmission data and communicate them to the access point. Outside of the time slot intended for them, the tags are operated in an energy-saving sleep state. In the sleep state, the logic stage only performs those activities required for timing purposes to wake up on time just prior to the respective time slot allocated to the tag, so that it is ready for communicating with the access point in the next time slot intended for it. During communication, a data packet comprising data about transmitter identification, receiver identification, control and/or information content can be used, as can data about reception quality or application.

With the assistance of a synchronization signal structure (e.g., a relative short signal at the start of the respective time slot) sent out via the access point in each of the time slots, the radio tags can synchronize themselves for the first time with the time grid of the time slot communication method, so as to start the communication operation with the access point, re-synchronize it during operation should it have lost the synchronous state for whatever reason, and keep it synchronous given the absence of any smaller deviations from the synchronous state caused by inaccuracies, such as a drift of its internal clock.

For example, the locating signal can comprise a fixed, predefined data signal structure and/or comprise a predefined data content. However, the locating signal can also comprise varying structures or a variable data content on a case to case basis. Any data contents, e.g., random data contents, can also be used if it has been determined in the system beforehand that a locating signal must now be expected. The locating signal can also contain the identification of the respective transmitting tag, or only be defined by this identification.

A radio tag, in particular its radio communication stage, can be designed so that the tag can itself determine or measure or even calculate the relative reception field strength of a received radio signal. A so-called "received signal strength indicator" (RSSI) is here provided in the tag, and represents an indicator for the reception field strength. Since the RSSI has no fixed unit, the value of the RSSI must be interpreted depending on the data sheet of the manufacturer, wherein a higher value for the RSSI usually denotes a higher reception field strength. Already the value of the RSSI taken by itself can serve as a gauge for reception quality. In addition, the tag, in particular its radio communication module or the logic stage, can be designed to determine the quality of data transmission for a received signal. A so-called "link quality" (LQ) is here determined in the tag. It may be advantageous to also consider the link quality in determining the reception quality, because aside from the RSSI, it also considers the quality of the data, i.e., the usability of the information content of the received radio signal. In a preferred embodiment, both values are weighted for determining the reception quality in such a way that the sum of the weightings yields 100%, meaning for example that the RSSI contributes 80% to the reception quality, and the LQ 20%. However, other weightings can also be used, e.g., 35% RSSI and 65% LQ or 50% RSSI and 50% LQ. However, a value for "link quality" taken by itself can also serve as a gauge for indicating reception quality.

The advantage to the invention is that a radio tag that is missing or to be localized can be found using one or more other tags. If only one other tag is used, its position can at least be narrowed down. However, several other tags whose position is known are preferably used. The more other tags are used, the more precisely the position of the tag to be localized can be determined. Therefore, the tag whose position is unknown can be found especially well using a swarm of other tags. As opposed to conventional methods, for example which require a special configuration of the access point or a special number of access points (e.g., three for triangulation) or a special positioning of the access points for ascertaining or narrowing down the position of a tag, only tags whose position is known are themselves used as position references in the present case. The plurality of small nodes (tag swarms) distributed in the room thus resolves a problem in a fast and efficient manner, which either can only be inadequately resolved with a number (2, 3 or 4) of access points somewhere in the room (e.g., centrally positioned), if at all. According to the invention, the significance of a distance from the respective transmitting tag is attributed to the respective reception quality determined on a receiving tag, from which, knowing the position of tags whose position is known, the position of the tag being searched for or to be tracked (whose position is unknown) can be determined or narrowed down.

The invention can be used effectively especially in a business premises, i.e., inside of a building, in which the entire business area is covered by radio with a few, e.g., only two, access points, and the radio ranges of the access points overlap over large areas. Up to 20,000 tags or more can there be localized in varying positions (e.g., on shelves or fastened to products). If, say, five of this large number are not in their predefined location, these missing tags are virtually impossible to find. The invention here solves the problem, offering a compact and efficient solution to finding or searching for or even tracking a single tag.

In all variants of the invention discussed below, a tag thus receives a communication of another tag, which is intended either for the receiving tag itself or for another receiver (e.g., the access point), and evaluated at the receiving tag with respect to its reception quality, yielding the basis for position localization. The accuracy rises with the number of tags participating in the search.

Additional, especially advantageous embodiments and further developments of the invention may be gleaned from the dependent claims and following description. The radio tag or even the system can here be further developed to reflect the dependent claims for the method. Advantages discussed in conjunction with features of one category or its claims also apply analogously to any other category or their claims.

A communication, e.g., between the radio tags or a radio tag and the access point, can take place bidirectionally or unidirectionally, or even encrypted, for purposes of localizing the position of the tag whose position is unknown or during normal communication operations.

In a first embodiment of the invention, the radio tag whose position is known and that received the locating signal transmits the evaluated reception quality to a data processing device, and the data processing device narrows down the position of the radio tag whose position is unknown, knowing the position of the radio tag(s) whose position is known and taking into account the reception quality received by the respective radio tag whose position is known. This measure can be used for a first application.

In this first exemplary application, let it be assumed that the tag whose position is unknown was instructed by the access point to transmit locating signals. Tags whose position is known were instructed by the access point to listen for them. The locating signals can be transmitted and received in a time window detached from the time slot communication method. However, they can also be transmitted in those time slots of the time slot communication method that are allocated to the respective tags whose position is known. The locating signals can be addressed or unaddressed. Each involved tag whose position is known registers each received locating signal and remembers (stores) the determined reception quality. In the present case, a data pair comprised of their own identifier and reception quality need not be stored; rather, it is sufficient to store the determined reception quality. This is because, in order to localize the position, the access point of each tag whose position is known is used to query the previously determined reception quality, wherein the access point knows with certainty from which tag whose position is known this happens. The access point, which knows the identifier of the tag participating in the communication, thus assembles the data pair on its side from the identifier of the tag whose position is known and that was just queried and the reception quality obtained by this tag, and delivers this data pair to the data processing device, where the final evaluation for localizing the position of the tag whose position is unknown takes place. Advantageous here is the relatively low data volume when transmitting the relevant data (in the present case, those data that only represent the reception quality) from the tag whose position is known to the access point.

In the first application, however, a data pair can also be generated from its own identifier and determined reception quality in the affected tag whose position is known, so as to communicate this data pair to the access point.

Within the framework of the first application, implementation can also involve having the tag whose position is known evaluate and provide the received locating signal in terms of the reception quality as well as the identifier of the transmitting tag whose position is unknown, i.e., transmit the latter to the access point for further processing by the data processing device. This is advantageous when simultaneously searching for several tags whose position is unknown.

In this first application, the values for reception quality required for localizing the position of the tag whose position is unknown, potentially also present as data pairs with identifiers, are available stored on individual tags whose position is known, as explained above, and can there be individually queried, i.e., collected for further processing. If the search takes place detached from the time slot communication method, the results of the evaluation (reception quality/data pairs) can be transmitted to the tag whose position is unknown in individual time slots after re-synchronizing the tags participating in the search, centrally collected there, and from there also be transmitted via the access point to a data processing device. However, they are preferably transmitted by the respective tags whose position is known directly via the access point to aforesaid data processing device.

In a second embodiment of the invention, the radio tag whose position is known that transmits the locating signal transmits the locating signal along with its identifier, and the radio tag whose position is unknown that receives the locating signal revaluates the locating signal with respect to the identifier transmitted along with the locating signal, and provides a data pair comprised of the identifier and accompanying reception quality. This measure can be used for a second and third application.

In the second exemplary application, let it be assumed that the tag whose position is unknown was instructed by the access point to listen for locating signals. Tags whose position is known were instructed by the access point to transmit locating signals addressed to the tag whose position is unknown. The tag whose position is unknown registers each received locating signal addressed to it with the help of the aforesaid data pair. Addressing can take place explicitly in the signal by indicating the identifier of the tag whose position is unknown, or implicitly arise from the behavior (transmitter or receiver state during a specific timespan) of the participating tags.

In the third exemplary embodiment, let it be assumed that the tag whose position is unknown was instructed by the access point to listen for locating signals. Tags whose position is known were instructed by the access point to transmit locating signals addressed to the access point. These locating signals can, but do not have to be regular data signals that are communicated by the tag whose position is known to the access point. While the tag whose position is known communicates data to the access point, the tag whose position is unknown listens in on this data signaling traffic to the access point. For example, this can take place by having the tag whose position is unknown be awake not just in its time slot and listening for signals, but also be awake in those time slots and listening for signals allocated to the other tags whose position is known. However, a timespan for this case can also be defined outside of the timing for the time slot communication method. Tags participating in the search must then exit the time slot communication method to receive the locating signals. The tag whose position is unknown registers each received locating signal addressed to the access point using the aforesaid data pair.

In both the second and third applications, the tag whose position is unknown listens for locating signals from the swarm or group of other tags whose position is known, and centrally accumulates a number of data pairs for subsequent evaluation.

Within the framework of the second embodiment of the method, the data pair could be evaluated for determining or narrowing down the position of the tag whose position is unknown, for example within the tag whose position is unknown. To this end, the tag whose position is unknown must know the positions of the other tags whose position is known, or at least know a correlation between the reception quality and distance. It can have obtained this knowledge by previously downloading corresponding data, e.g., position data for tags whose position is known, from a data processing device. To determine its position, the tag whose position is unknown converts the reception quality into a distance from the respective tag identified by the identifier, and can roughly narrow down or even determine relatively precisely its position depending on the number of received locating signals. The distance determined by the respective tag identified by the identifier can still be subjected to a correction, wherein this correction takes into account the environment of the respective tag, and thus the signal propagation characteristics in its environment. The position determined in this way is then transmitted to the data processing device. However, the position of the tag whose position is unknown can also be determined relative to the tag whose position is known.

However, each radio tag whose position is unknown that receives the locating signal preferably transmits the data pair to a data processing device. This is to be preferred, since the computationally intensive and ultimately energy consuming activities of the logic stage are avoided as a result. All data pairs or just a selection thereof corresponding to a criterion can be transmitted. For example, the criterion used can be the reception sequence or ranking based on reception quality. Only the five or ten best ranked data pairs can then be transmitted, for example, which brings with it a significantly improved energy efficiency than if all data pairs available were to be transmitted. System efficiency is also improved significantly, because transmission takes place faster, and the system returns to the normal mode earlier than would be the case given a complete transmission of all data pairs. After reception of the data pair(s), the data processing device narrows down the position of the radio tag whose position is unknown, knowing the position of the radio tag whose position is known and taking into account the data pairs received by the radio tag whose position is unknown. Even though the position of the tag whose position is unknown continues to be determined based on monitoring the communication between a tag and its environment, while activities that require memory resources and computational power are outsourced to the data processing device. After one or more data pairs have been received, the data processing device has at its disposal all additional information for determining the position of the tag whose position is unknown, for example the position coordinates of the tag whose position is known, the correlation between the reception quality and distance for the respective tag, and potentially also the correction to be applied in considering the environment of the respective tag. For example, if aforesaid used tag is integrated in an electronic price-indicating sign, the data processing device has at its disposal exact coordinates for tags whose position is known, since each price sign is allocated to precisely one product, and the position of the product in the store is notated in a so-called planogram down to its exact location in a shelf. Proceeding in this way also ensures that the energy reserves of the tag whose position is unknown are conserved as much as possible. If no planogram is available, known coordinates of the tag whose position is known and/or relative distances between the tags whose position is known can be used to localize the unknown tag.

In another aspect of the invention, the radio tag intended for transmitting the locating signal, in particular the tag whose position is known, is switched from its normal mode into a search mode by a received search command, wherein the locating signal and/or the time for transmitting the locating signal and/or the frequency of transmitting the locating signal is determined in the mode. The switch is made by decoding the search command by means of the logic stage.

A timing that deviates from the time slot communication method used in the normal mode can be applied as the time for transmitting the locating signal. Transmission can here be started as soon as the last search command was delivered to an involved tag. The start can here take place upon expiration of the respective time slot cycle, or also before the respective time slot cycle has even completely expired. Exiting the timing of the time slot communication method in this way can be advantageous, since a tag in a state where it listens for signals must remain in its active state for relative long timespans by comparison to its timing in the time slot communication method, which negatively affects its energy balance, and leads to a shortened service life. The faster the search begins and the faster the search is again concluded, i.e., the normal mode in the time slot communication method is assumed, the more energy efficiently the system of tags operates. However, the time for transmitting the locating signal can also be defined by the time slot already being used in the normal mode, which is provided for communicating with the respective tag. As opposed to the normal mode, this time slot does not involve searching for signals transmitted via the access point, but rather transmitting the locating signal. Regardless of whether the time slot communication method is retained or exited, transmission of the locating signal can also be started at any point in time, in particular one to be defined in advance.

The definition can also call for the locating signal to be transmitted more frequently than just one time, for example to have several locating signals from one and the same tag available for further processing. This permits a statistical evaluation of the respective locating signal, which can improve the accuracy of position localization. However, this can also ensure that there will be an elevated probability of receiving the locating signal at least one time in the event of disturbances during signal transmission. For example, transmission can take place within a defined timespan at random times autonomously determined by the tag. However, transmission can also take place at fixedly (pre)set times.

In another aspect of the invention, the tag intended for receiving the locating signal, in particular the tag whose position is unknown, is switched by a received locating command from its normal mode into a locating mode, wherein a reception readiness for receiving locating signals exists in the locating mode for a locating signal reception duration. Switching takes place by decoding the locating command by means of the logic stage. By comparison to the regular reception duration of a time slot according to the time slot communication method, the tag can here assume a lengthened reception duration in the normal mode, and hence extricate itself from the time slot communication method characteristic for the normal mode. In contrast to the normal mode, the affected tag now also lies outside of the time slot intended for communicating with the access point in its active state, and can receive the locating signals of the other tags in the aforesaid lengthened reception duration. The length of the locating signal duration can be fixedly predefined or respectively adjusted by the access point for the search in question. However, the expiration of the locating signal reception duration can also be indicated at an appropriate time by a command or status message generated by the access point or one of the tags. The time at which the locating signal reception duration starts can correspond to the time at which the transmission of the locating signal starts, just as explained above, but also be set for an earlier or later point in time.

It has proven especially advantageous to design the locating signal reception duration so that all radio tags whose position is known and that are involved in the search for the radio tag whose position is unknown can transmit their locating signal at least one time within the locating signal reception duration, but preferably several times. An adjustable value for the locating signal reception duration can be transmitted to the tag whose position is unknown for determining the locating signal reception duration already with the transmission of the locating command. The time slot communication method is preferably exited at the start of the locating signal reception duration. The set locating signal duration can have any value desired, but can preferably be a multiple of the duration of a time slot of the time slot communication method in order to enable as quick a re-synchronization of the system as possible upon expiration of the locating signal reception duration. After the locating signal reception duration has started, all tags assigned with transmitting the locating signal transmit their locating signal at times determined by them at the previously defined frequency. For example, the plan for a specific tag may call for transmitting N times (e.g., times) in the locating signal reception duration, and the respective tag distributes the appearance of the respective locating signal randomly within the available timespan of the locating signal reception duration. In the receiving tag, this leads to a statistical distribution of received locating signals and accompanying reception qualities, and allows the receiving tag to recognize and eliminate obviously unusable locating signals.

Once the locating signal reception duration has expired, all tags participating in the search re-synchronize themselves with the time slot communication method once again.

To allow the received locating signals to be used for determining the position, it is advantageous that the radio tag intended for receiving the locating signal, in particular the radio tag whose position is unknown, store the data pair for each locating signal received during the locating signal reception duration for later use. For example, the stored data pairs can be sorted in descending order of determined reception quality for further use. If permitted by the computing power of the logic circuit, this can already take place successively in the locating signal reception duration while receiving a new locating signal, or otherwise only upon expiration of aforesaid locating signal reception duration or even at a later point in time, outsourced to the data processing device.

In order to ensure that all receivable locating signals are accumulated as quickly, efficiently and uninterruptedly as possible, it is advantageous that the radio tag intended for receiving the locating signal, in particular the radio tag whose position is unknown, only transmit one or more stored data pairs after the locating signal reception duration has expired, wherein these data pairs are communicated via the access point to the data processing device, where final locating can take place. The data pairs can be transmitted within a predefined transmission duration, which can be part of implementing the locating mode. Just as the locating signal reception duration, the transmission duration can measure a multiple of the duration of a time slot for a communication in the normal mode. This case can also be implemented in the search mode, so that no disturbances caused by radio signals or collisions with radio signals of tags whose position is known arise during radio communication with the access point, i.e., the tags whose position is known behave calmly and transmit no signals. Only after data pair transmission is complete can both the search mode and locating mode be exited, and the normal mode be resumed. On the other hand, the normal mode can be resumed for all participating tags after the complete transmission of all locating signals, or in other words after the expiration of the locating signal reception duration and re-synchronization for the tags participating in the search, with the data pairs being transmitted to the data processing device in the normal mode and in the respective predetermined time slot. The fastest possible restoration of normal operating conditions is ensured for all participating tags in this variant.

In another aspect of the invention, the radio tag whose position is unknown exhibits an indicating device, wherein the latter is used to visualize status information, which represents its internal or system-wide status as a tag whose position is unknown that is to be located. In this embodiment, for example, the tag can be a constituent of an electronic price-indicating sign (also referred as "electronic shelf label", abbreviated ESL). In the normal mode, the indicating device is used to display product prices or additional information relating to the product. As soon as the logic stage of the tag changes its operating state from the normal mode to the locating mode in response to the received locating command, this is visualized by means of the logic stage using the indicating device in the form of status information, in particular which a person can read. For example, the display of the indicating device can read as follows: "Locating mode active". In addition, instructions to people can be visualized, e.g., "I am wanted, please bring me to the cashier!". For cases in which the status information is not to be readable for a person, a so-called QR code can also be used, which is to be automatically processed, for example by an optical reader. The indicating device can be realized with LCD technology, for example, but preferably also with electronic ink technology (also referred to as E-ink as a synonym for electronic paper).

In particular preliminarily, e.g., before transmitting the search command and/or locating command, it has proven especially advantageous for the radio tags to perform a calibration communication with an access point whose position is known, and to which the radio tags are allocated, wherein the reception quality is determined for each involved radio tag, and a correlation is defined between the determined reception quality and the position for the respective radio tag whose position is known. This improves the position localization by means of locating signals received from the tag whose position is unknown, since the reception quality depends heavily on the environment of the respective tag. For example, ranges of up to 100 meters are possible in an open field, while a range of approx. meters is virtually impossible to exceed on a business premises due to reflections and/or screening.

In another aspect of the invention, the tags communicate with an access point in a normal mode using a time slot communication method, wherein, according to this time slot communication method, a defined number of time slots is available in a defined time unit, and one or more radio tags is/are allocated to one of the time slots, and each radio tag can be individually addressed in its time slot, so as to receive data or commands from the access point and/or transmit data to the access point, wherein the tag whose position is unknown and/or at least one tag whose position is known exit(s) the time slot communication method so as to transmit or receive the locating signal. Exiting the time slot communication method means that the affected tag now follows another timing. As a consequence, the locating signal can be received or transmitted in another time slot to which the affected tag is not allocated in the normal mode. In like manner, the systematics of the time slots can be abandoned completely, and transmission or reception can take place within a timespan that no longer corresponds to a time slot, e.g., lasts significantly longer. This measure contributes to system efficiency, since the search process can be executed relatively quickly, and, liberated from the timing straight-jacket imposed by the time slot communication method, as many radio tags as possible can participate virtually simultaneously in a swarm in searching for the missed radio tag.

After the locating signal has been transmitted or received, the affected radio tags again join the time slot communication method, and return to the normal mode. After rejoining, the tags are again available for communicating with the access point in each time slot allocated to the affected tag. Joining can take place immediately after the search process has concluded, or at a later point in time. Upon conclusion of the transmission and reception sequence, the radio tags can remain in the sleep state until the next time slot cycle starts, wake up shortly beforehand, assume the active state, wait in the active state until receiving their synchronization signal, which they use to identify the allocated time slot, and return back to the normal mode via re-synchronization. In the event the tags have exited the timing of the time slot communication method in order to transmit or receive the locating signal, it is advantageous that the tags be designed to independently calculate the earliest possible time for joining. The following is known in the system of tags when exiting the time slot communication method:

The duration D1 of the synchronization cycle (e.g., 15 seconds for all tags).

The time D2 at which the time slot allocated to the respective tag starts (e.g., 6.3 seconds for tag x).

The starting time D3 of the locating signal reception duration in the synchronization cycle (e.g., 13 seconds for all tags).

The duration D4 of the locating signal reception duration (e.g., 3 seconds for tag x).

The duration D5 of the lead time selected for waking up the respective (each) tag from the sleep state on time prior to the appearance of the time slot to which the tag is allocated (e.g., 1 second for all tags).

These five parameters D1-D5 can be used to calculate the optimal, specifically the next, possible point in time, so as to wake up the affected tag after the end of the locating signal reception duration in a timely fashion prior to the appearance of the next time slot to which the respective tag is allocated, and re-synchronize it with the timing of the time slot communication method again by receiving the synchronization signal structure. Formula 1 below is used to calculate the retention time D6 in the sleep state upon expiration of the locating signal reception duration.

$$D6=D1-((D3-D2)+D4)-D5 \qquad \text{Formula 1:}$$

In the present example, a value of 4.3 seconds is calculated for D6. Since in this example the locating signal reception duration starts at second 13 in the first synchronization cycle and the duration D4 of the locating signal reception duration measures 3 seconds, the locating signal reception duration extends for 1 second into the next (second) synchronization cycle. Parameter D6 now affirms that one must wait for 4.3 seconds after the first second of the next (second) synchronization cycle, i.e., until the absolute time stamp reaches 5.3 seconds in this synchronization cycle, until the affected tag x awakes from the sleep state. This tag x thus wakes up 1 second prior to the appearance of the next possible time slot relevant to it. In analogy to the first synchronization cycle, the relevant time slot starts at the absolute time stamp of 6.3 seconds in the second synchronization cycle. However, the correct wakeup time need not measure 1 second, but can rather also assume higher or lower values depending on permissible system limits, e.g., 0.5 or 0.2 or even 0.1 seconds. In addition, the advantage to rejoining the timing of the time slot communication method as quickly as possible is that no escalation takes place in the drift of the internal time base for the tags participating in the search, as well as in the drift of the tags which, while allocated to the access point triggering the search, do not actively participate in the search, but rather remain in the sleep mode during the search.

In another aspect of the invention, a data processing device is used to select aforesaid group of radio tags from the totality of tags in a system. Since a number of tags is always allocated to a specific access point, a reduction to a group of radio tags having a lower number than the number of tags allocated to the access point can increase both the efficiency and effectiveness of the search. In addition, this measure is also extremely energy efficient for the non-participating tags.

It has proven especially advantageous for the radio tag to exhibit a sensor for emitting a sensor signal indicating that the radio tag was removed from another object, in particular a shelf, and for the logic stage to be designed to emit a status message about the radio communication stage if the sensor signal is present, wherein the status message represents the detected removal from the other object. Configuring the tag in this way allows the tag to itself start the method for locating its own position automatically. The status message can here be communicated to the access point to which the tag is allocated in the next time slot allocated to the tag, and the process for locating the radio tag whose position is unknown can be started there autonomously or after coordination with the server responsible for managing the system. The sensor can be realized using a stylus (pin), whose penetration depth into a housing of the tag was automatically determined, e.g., with a contact that is either closed or open. However, the sensor can also detect the loss of contact with the object in a capacitive, inductive or any other suitable manner. For example, the appearance of the sensor signal can be mechanically or electronically stored, so as to retain it until the next time the tag wakes up. However, the sensor signal can also be used to proactively wake up the tag. These measures sustainably prevent the loss of contact from being manipulated once detected.

In another aspect of the invention, the system can be designed in such a way that, once a radio tag whose position is unknown has been located, a number of radio tags whose position is known and which are positioned adjacent to the located radio tag are prompted to indicate the location of the radio tag whose position is unknown in their environment by means of their indicating device, e.g., by displaying a symbol, such as a circle, or a blinking behavior, etc. As a consequence, this selected group of radio tags whose position is known can be used on the one hand to visualize the system status with regard to the conclusion of locating the radio tags whose position is unknown, and on the other hand, given their proximity to the radio tag whose position is unknown, to facilitate the manual searching process. With their indicating device, the selected radio tags whose position is known make it easier for a searching person to narrow down the area in which the radio tag whose position is unknown can be found. As a consequence, the searching person is guided to the target area.

This and other aspects of the invention may be gleaned from the figures discussed below.

BRIEF DESCRIPTION OF FIGURES

The invention will be explained once again in more detail below drawing reference to the attached figures and based upon exemplary embodiments, with the invention not being limited thereto. The same components are here provided with identical reference numbers on the various figures. Schematically shown on:

FIG. 4 is a data structure according to a first exemplary embodiment for locating a radio tag;

DESCRIPTION OF THE EXEMPLARY EMBODIMENTS

Figure 1:
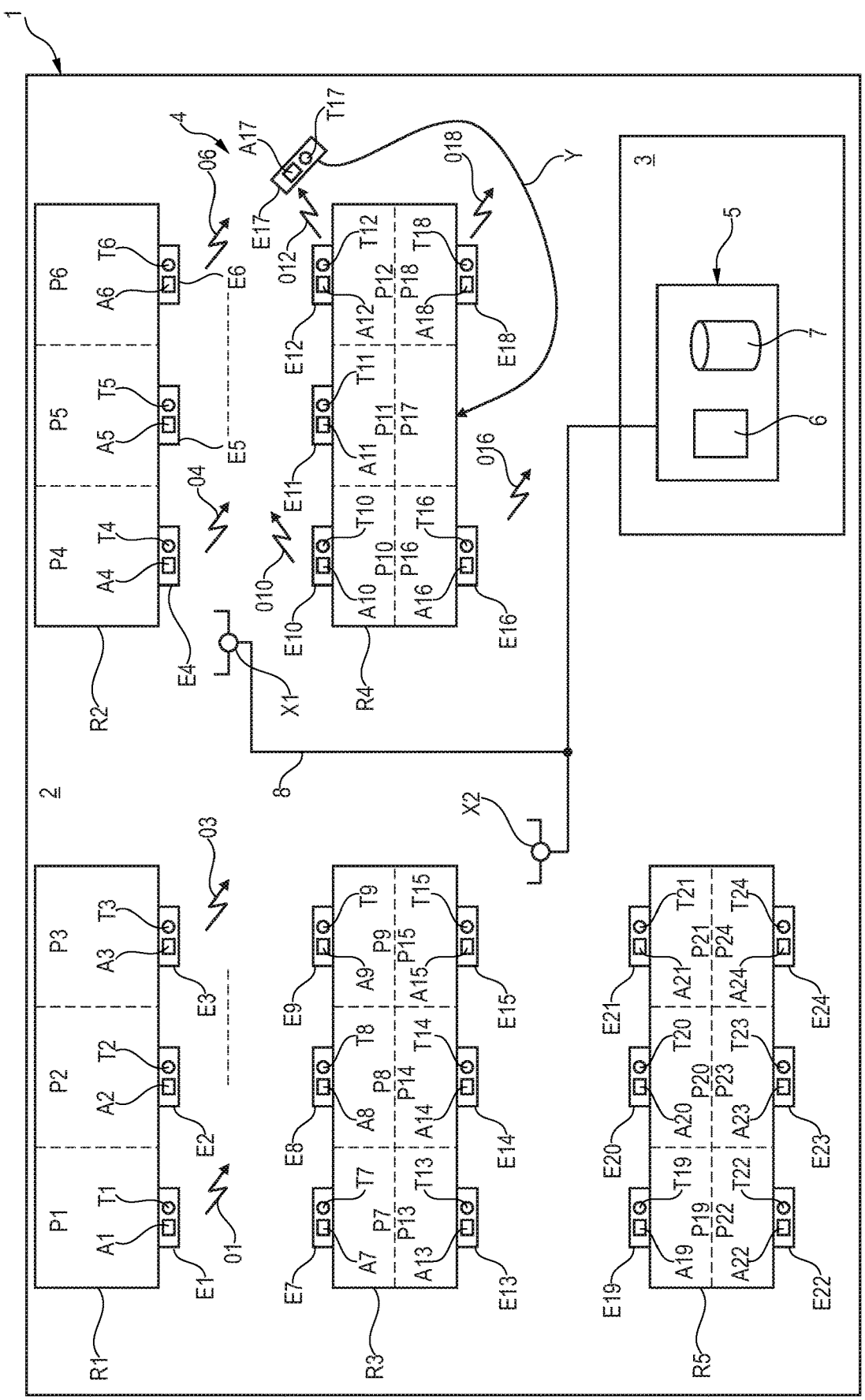
FIG. 1 is a system according to the invention.

Shown on FIG. 1 is a system 4 in a business premises 1, which is divided into a showroom 2 and an administrative office 3. The system 4 exhibits a group of radio tags, abbreviated tags, T1-T24. Each tag Tn stores an identifier K1-K24 unique to the respective tag Tn in the form of data (not visualized on FIG. 2, but see FIG. 2), so as to clearly identify it. Each tag Tn forms a constituent of the electronic price-indicating sign E1-E24. Each price-indicating sign En exhibits an indicating device A1-A24. Each price-indicating sign En except for the seventeenth price-indicating sign E11 is fastened to an attachment rail of a shelf R1-R5. Each shelf Rn has individual products P1-P24, and the indicating devices An display the respective prices for the products Pn. The seventeenth price-indicating sign E11 was removed from its planned, seventeenth space (denoted by arrow Y), and is located on the floor near the fifth shelf R5. The system 4 further exhibits a server 5 that comprises a data processing device and has processing means 6 as well as storage means 7. The system 4 further exhibits two access points X1 and X2, which are connected with the server 5 by a hardwired network 8.

Before the tags Tn can be used in the system 4, they must be manually secured to the positions provided for them on the shelves Rn, and register to the system 4. The tags Tn here receive radio signals from the access points Xn, and, as a function of the reception quality of the radio signals, register to the access point Xn for which the best reception quality is present. In the case at hand, let it be assumed that the Tags T1-T6, T10-T12 and T16-T18 are allocated to the first access point X1, and the tags T7-T9, T13-T15 and T19-T24 are allocated to the second access point X2. The communication by which prices or other information relevant to the customer are communicated by the access point Xn to the tags Tn in their normal mode takes place by means of a time slot communication method. Within n seconds, m time slots are here used. Each of the tags Tn is allocated to a time slot, wherein several tags Tn can also be allocated to a specific time slot. The tags Tn are in their sleep state outside of their time slot, and in their active state just before their time slot and while in their time slot. By waking up prior to the time slot in question on time, they can keep their internal clock synchronous with the time grid of the time slot communication method, and thus reliably transmit data in their time slot with the access point Xn, to the extent required by the access point Xn.

A planogram is stored in digital form 1 with the storage means 6. A planogram is a schematic drawing of a retail store device that illustrates product placements. As a result, the stored planogram represents the relationship between a shelf location, a product, an EAN code and an identifier Kn of the respectively allocated tag Tn of the electronic price-indicating sign in the form of a digital list or a database. For example, this relationship can be established by means of wearable EAN code readers, with which the EAN code of a product Pn can be read in, transmitted to the server 5, and allocated to a tag Tn at the server 5.

Figure 2:
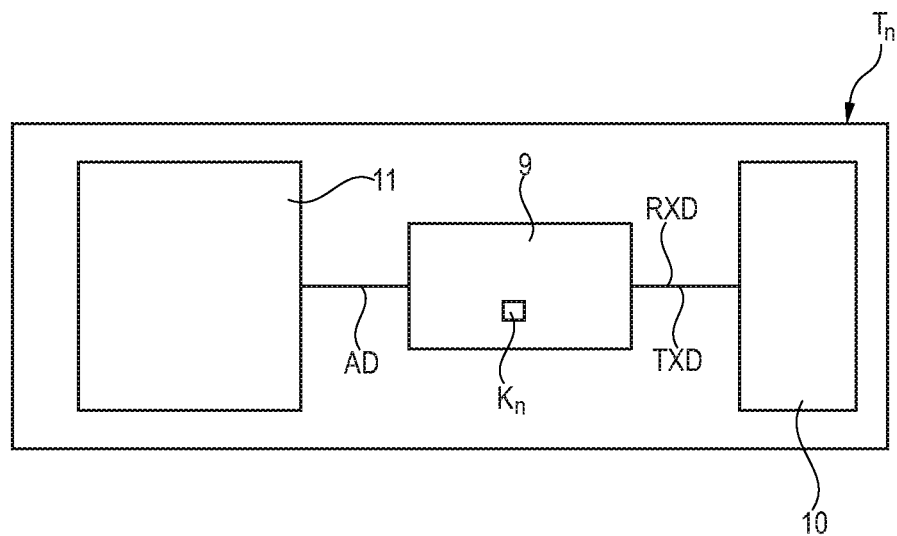
FIG. 2 is a block diagram of a radio tag according to the invention.

The tags Tn all have an identical design. FIG. 2 visualizes the structure of one of the tags Tn. The tag Tn comprises a logic stage 9, a radio communication stage 10 and an indicating device 11. The radio communication stage 10 realizes the analog interface, with which radio signals can be exchanged with the access points Xn. Corresponding receiving and/or transmitting data RXD, TXD are communicated between the radio communication stage 10 and logic stage 9.

The logic stage 9 processes data and commands, in the present case in particular a search command and a locating command, and apart from a normal mode also provides a search mode and locating mode. Once the search command has been received, a switch is made from the normal mode to the search mode. Once the locating command has been received, a switch is made from the normal mode to the locating mode. In the search mode, a locating signal On that comprises the identifier Kn of the respective tag Tn is generated, and transmitted as a radio signal in the time slot allocated to the respective tag Tn. A switch is then made from the search mode to the normal mode. In the locating mode, a reception readiness for receiving locating signals On during a locating signal reception duration is established, which is present as soon as the locating signal is transmitted. Each received locating signal On is evaluated for its reception quality Qn and the identifier Kn transmitted with the locating signal On, and a data pair Dn consisting of the identifier Kn and reception quality Qn is stored. After the locating signal reception duration has expired, the stored data pairs are ranked in descending order of reception quality, and communicated by radio signals to the server 5, where further evaluation takes place.

The indicating device 11 is based on extremely energy-saving electronic ink technology (also referred to as E-ink as a synonym for electronic paper), and is initiated by the logic stage 9 with display data AD, which are converted into visually perceivable information.

In reference to FIG. 1, let it now be assumed that the seventeenth price-indicating sign E17 was removed from its planned, seventeenth spot (denoted by part Y), and is now located on the floor, but still in proximity to the fourth shelf R4, and also within communication range of the first access point X1. As part of a routine visual inspection of the price-indicating signs En, an employee noticed that the seventeenth price-indicating sign is missing. He or she uses their EAN scanner to scan the EAN product code of the product P17, transmits the EAN product code via a conventional WLAN infrastructure (not shown; an infrastructure differing from the communication infrastructure of the access point) of the business premises 1 to the server 5, and starts a search query at the server 5. The seventeenth tag T17 is identified as a tag to be searched at the server 5. Since a communications link still remains between the seventeenth tag T17 and first access point X1, the search to be started by the server 5 is confined to involving tags T1-T6, T10-T12 and T16-T18. A process 12 for locating the seventeenth tag T17 is now started for this partial group of tags Tn, wherein reference is made below to the flowchart according to FIG. 3.

Figure 3:
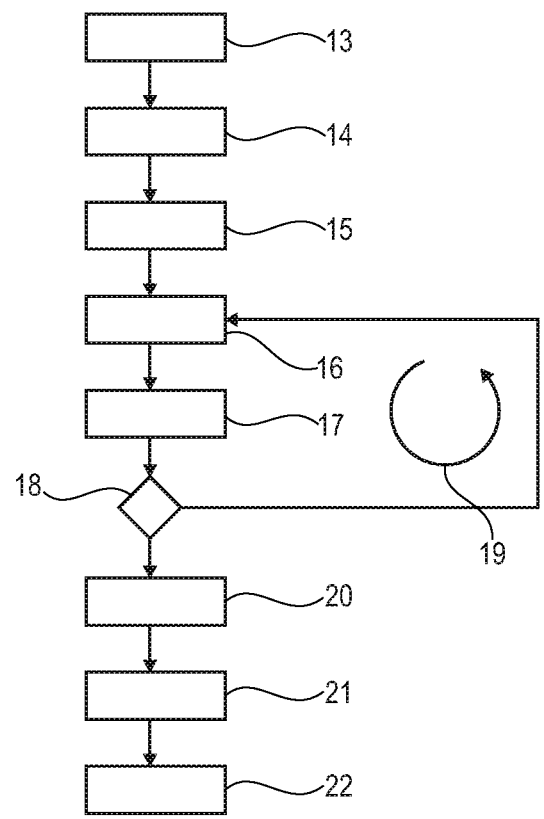
FIG. 3 is a flowchart for a method according to the invention.

The process 12 is started in a block 13, and it is assumed that all tags Tn are in the normal mode. The locating command is sent to the seventeenth tag T17 in a block 14, and this takes place in the appropriate time slot for communicating with the seventeenth tag T17. This causes a switch from the normal mode to the locating mode at tag T17. The tag 17 in the locating mode visualizes its status by means of the indicating device A17, wherein "locating mode active" is displayed as status information. The search command is sent to the tags T1-T6, T10-T12, T16 and T18 in a block 15, and this takes place in the appropriate time slot for the respective tag T1-T6, T10-T12, T16 and T18. This causes a switch from the normal mode to the search mode at tags T1-T6, T10-T12, T16 and T18. Since the case at hand involves a time slot communication method, the blocks 14 and 15 on FIG. 3 illustrate more of a logic state, and do not necessarily indicate the chronological sequence when switching from the normal mode to the locating mode or search mode.

Let it be assumed below that the respective tag Tn transmits the locating signal strictly according to the time grid of the time slot communication method. Only the seventeenth tag T17 to be searched for is in the locating mode during the entire number of time slots. The transmission of locating signals by the participating tags starts after all participating tags have received and processed their respective command (locating command, search command) with the beginning of the next time slot cycle.

In a block 16, the first locating signal O1 is transmitted by the first tag T1 being operated in the search mode in the time slot allocated thereto. In a block 17, the first locating signal O1—to the extent physically possible—is received by the tag T17 being operated in the locating mode, evaluated with respect to the first reception quality Q1 and identifier K1, and a first data pair D1 comprised of the reception quality Q1 and identifier K1 is stored. In block 18, a check is performed at tag 17 as to whether the locating signal reception duration has already expired. Should this not be the case, the process 12 branches to block 16, wherein the next locating signal O2 is transmitted by the tag T2 in the time slot allocated thereto. In block 17, this second locating signal O2—to the extent physically possible—is received by the tag T17 being operated in the locating mode, evaluated with respect to the second reception quality Q2 and identifier K2, and a second data pair D2 comprised of the reception quality Q2 and identifier K2 is stored. A loop 19 formed by blocks 16, 17 and 18 is run through as often as it takes for all tags T1-T6, T10-T12, T16 and T18 participating in the search for the tag T17 being operated in the locating mode to transmit their respective locating signal O1-O6, O10-O12, O16 and O18 in the respective time slots allocated to them, or in other words until the locating signal reception duration has expired. In the case at hand, it was determined that the locating signal reception time measures precisely one time slot cycle. Since the time grid of the time slot communication method was used in the present case, no re-synchronization is necessary at least for the tags T1-T6, T10-T12, T16, T18 that transmit the locating signal. Only tag T17 must re-synchronize itself.

However, the locating signal reception duration can also extend over several time slot cycles.

As explained above, visualizing in the form of blocks 16, 17 and 18 in this conjunction is geared more toward illustrating how the method is logically structured rather than reflecting the chronological sequences.

The list of data pairs Dn stored in the seventeenth tag T17 forms a data structure DS for determining or narrowing down the position of the tag T17 that stores this data structure DS. The stored data structure DS is illustrated on FIG. 4. The data structure DS exhibits the identifiers Kn in a first column, and the values representing the reception quality En, e.g., the RSSI value, in another column. The respective value of the RSSI is lower for tags Tn lying further away in relation to the position of the tag T17 and for more heavily screened tags Tn (e.g., tags hidden behind shelves and products), and higher for tags Tn that are closer to the tag 17 and/or less screened.

In further consequence, the seventeenth tag T17 transmits the stored data pairs Dn to the server 5. Depending on the number of stored data pairs Dn, this takes place in a single time slot allocated thereto, or in a number of such time slots appearing in a time-staggered manner.

In a block 21, the position of the seventeenth tag T17 whose position is unknown is determined or at least narrowed down based on the data pairs Dn transmitted to the server and the known positions of the tags T1-T6, T10-T12, T16 and T18. By sorting the transmitted data structure DS based on descending values of the RSSI, it is determined that the searched/missing tag T17 must be located in an area between tag T6 and T12, but to the right of tag T12 and closer to tag T12 than to tag T6.

The position of the seventeenth tag T17 determined in this way is reported, i.e., disclosed, to an employee, e.g., via the mobile EAN code reader, so that he or she can track down tag T17 in as targeted a manner as possible, and secure it to its planned spot on the shelf 4 in the area of the product P17. Once there affixed, the employee can use his or her EAN code reader, for example, to initiate a calibration sequence, in which the communication parameters relevant for communicating with the seventeenth tag 17 (e.g., RSSI and/or link quality) can be acquired for his or her desired position.

The status information "locating mode active" provided by the indicating device can accelerate the manual process of tracking down, specifically in instances where the electronic price-indicating sign E17 was consciously, i.e., deliberately, or accidently fastened to a shelf position not allocated to it by plan. In addition, the provided status information ("locating mode active" without any other product data or price information) ensures that a customer will not be misled by such wrongly positioned price-indicating signs. This display of status information can also be retained in the already resumed normal mode.

The measures according to the invention discussed in detail above can also be used for automatically verifying the position of individual tags Tn. The server 5 knows the desired position of each tag Tn in the business premises 1 visualized on FIG. 1, and hence also the proximity or distance of the individual tags Tn relative to each other. The server 5 automatically switches a respective one of the tags Tx (with x=1 . . . m; m=total number of tags) to the locating mode and all other tags Tn (n=1 . . . m without x) to the search mode, and, after implementing the process for locating the tags Tx, receives and processes the respective data structure DS. The obtained data structure DS is used at the server 5 to check whether the tag Tx is localized at its desired position with sufficient probability. If the probability is insufficient, e.g., because the deviation from the desired values for the reception quality of the tags Tn is too high for an expected configuration of adjacent tags Tn, or basically an unexpected configuration of adjacent tags Tn is determined, the affected tag Tx can be tracked down at a later point in time by an employee, for example. This automatic verification of position for all tags Tn can be performed every weekday outside of business hours, for example periodically.

However, the tags Tn can also be designed to independently determine that they were removed from a shelf Rn. This can take place by means of a sensor (not shown, e.g., integrated into the electronic price-indicating sign), which is coupled with the logic stage 9. As soon as the tag Tn in its normal mode switches from the sleep state to the active state, the sensor status of the sensor is checked. If the sensor status indicates that the connection to the shelf Rn has been lost (e.g., at the time the active state is assumed or even before that), the affected tag Tx reports this to the server 5 in the next time slot provided for its communication. The process for locating the tag Tx whose position is unknown is then implemented for the affected tag Tx. The data structure DS obtained from the tag Tx is used for localizing the tag Tx at the server 5, as discussed above.

However, the process for locating the tags Tx whose position is unknown can also be automatically started by the server 5 even when the server 5 determines that the tag Tx has reported to an access point Xn for communication, which based on its position should with a high degree of probability not even be available for a communication with the tag Tx at all.

However, the measures according to the invention discussed above can also be used to track a moving tag Tx whose position is unknown. In this application, a number of tags Tn whose position is known are placed in known positions (e.g., at periodic intervals) in a room (e.g., fastened to the floor or ceiling or built in there). The tag Tx whose position is unknown is fastened to a shopping cart, for example, which is moved by a person through the business premises. In order to track the movement of the shopping cart, the process for locating the tag Tx is started at specific times (e.g., every 10, 20, 30 or 60 seconds), and then executed, so that, for example, a data structure DS is transmitted from the tag Tx to be located to the server in periodic intervals, where the trajectory of the shopping cart, and ultimately of the person, is available based upon the configuration of the immediate neighbors of tags Tn, which changes during the movement. If the tag Tx whose position is unknown is coupled with an indicating device similarly to one of the electronic price-indicating signs, location or rather product-related information can be presented within the context of the respectively determined position, in particular during a movement in a business premises. An expansion of this application can also provide that the tag Tx whose position is unknown and which is fastened to the shopping cart exhibit an interface for communicating with the other mobile device, for example a mobile phone or smart phone of the person. A purchase list can be transmitted to the tag Tx via this interface, which consequently is made available to the server 5 via the respective access point Xn. Based on the determined position or movement of the tag Tx, the server 5 can provide navigation information on the indicating device coupled with the tag Tx, and in this way support the person in transacting the purchases.

Figure 5:
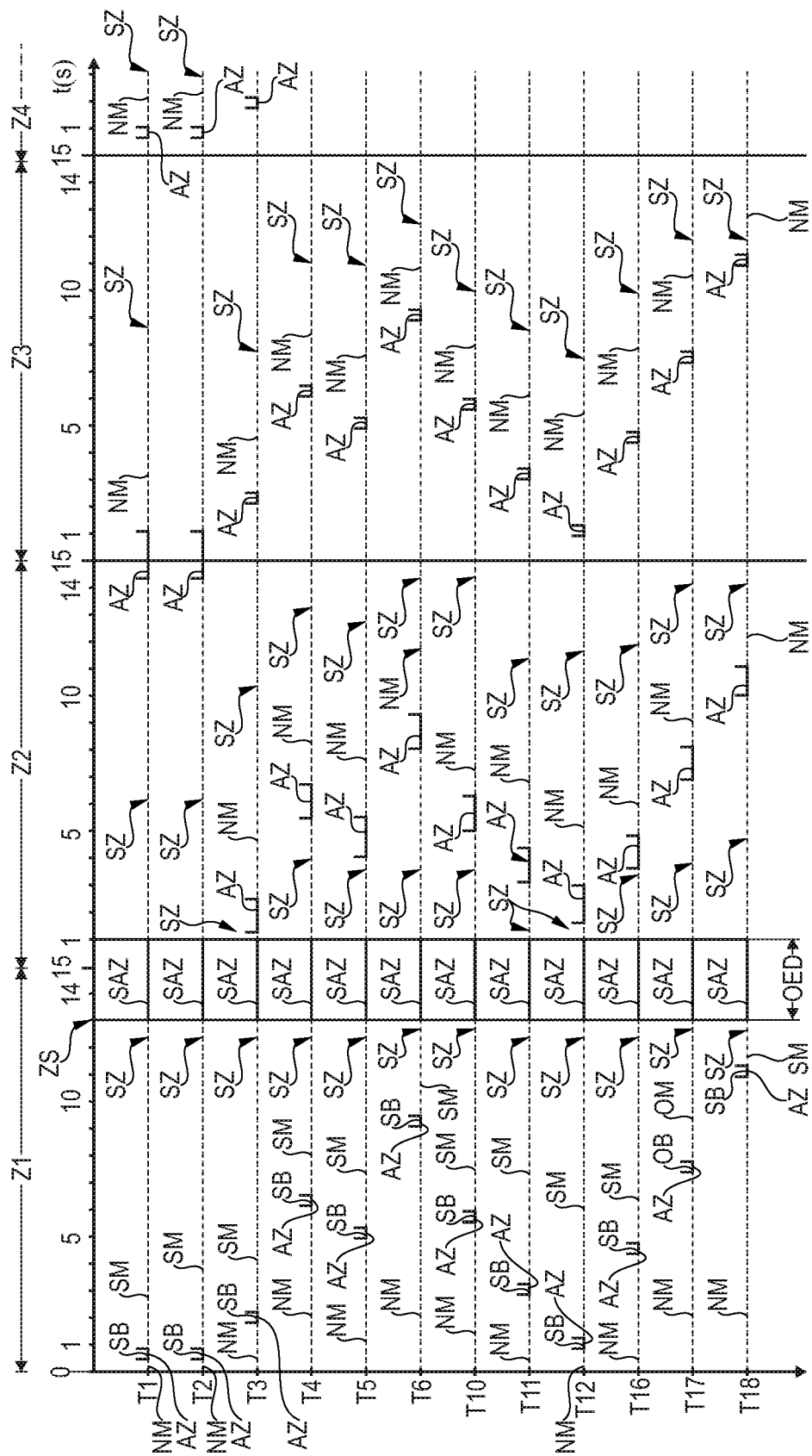
FIG. 5 is a state diagram for tags according to a second exemplary embodiment of the method.

FIG. 5 explains another embodiment of the method described in conjunction with FIG. 1 in the form of a state diagram. The time t is recorded along the abscissa in seconds for each of the four time slot cycles Z1 to Z4, wherein each time slot cycle lasts for seconds. Within a time slot cycle Z1-Z4, for example, 255 time slots are available per second for communicating with the access point X1 (see FIG. 1).

The tags Tx participating in the search are recorded on the ordinate. The states or modes for the individual tags Tx are recorded in chronological sequence from left to right in the abscissa direction.

The embodiment discussed here can also be applied to the system explained according to FIG. 1 and the other exemplary applications and exemplary embodiments described in detail. In contrast to the explanations for FIG. 1, however, the timing of the time slot communication method used in the normal mode is exited in the present case. This approach has proven to be faster, more efficient, and consume less energy, and will be described in detail based on FIG. 5.

For reasons of clarity, it was decided not to illustrate the time slots themselves (e.g., 255 per time slot cycle). Within the first time slot cycle Z1, the tags T1-T6, T10-T12, T16 and T18 allocated to the first access point X1 receive the search command SB in the respective time slots allocated thereto, and the tag 17 receives the locating command OB. As also shown on FIG. 5, several of the tags T1-T6, T10-T12, T16-T18 (collectively referred to as Tn) can be allocated to one and the same time slot (e.g., see: T1 and T2). The consecutive numeration using the numbers one to eighteen divulges nothing about the allocation of the tags T1-T18 to one of the time slots, e.g., which can take place via a distinct address of the respective tag Tn, such as the Mac address (hardware address). The allocation was determined in advance, and is known to the access point X1. Before receiving the respective command SB, OB, the tags Tn in the normal mode NM are in the sleep state SZ. While receiving the commands SB, OB, the tags Tn are in the active state AZ. After processing the command SB, OB, the tags T1-T6, T10-T12, T16 and T18 are in the search mode SM, and tag T17 is in the locating mode OM.

Within the framework of this communication (delivery of commands SB, OB), the tags Tn are also notified about the time slot or absolute time stamp in the first time slot cycle Z1 at which the search for the tag T17 whose position is unknown is to be started. In the case at hand, the time stamp of 13 seconds has been set as the starting time for the locating signal reception duration OED in the first time slot cycle. The locating signal reception duration OED was set at 3 seconds, and thus extends by one second into the second time slot cycle Z2. However, this information can also be transmitted in advance to prepare for the search in a time slot cycle (not shown) preceding the first time slot cycle Z1.

Within the framework of delivering the commands SB and OB, the tags T1-T16 and T18 are also notified that each of them must transmit fifty locating signals within the locating signal reception duration OED. This can also be disclosed to the tag T17 whose position is unknown, but does not have to be.

After receiving the commands SB, OB, the tags Tn again return to their sleep state SZ, and remain in the sleep state SZ until starting time ZS. In contrast to the normal timing of the time slot communication method, their timing now proceeds differently than in the normal mode NM, in which they would wait for the next time slot allocated thereto in the second time slot cycle Z2. In the modified timing, the tags T1-T18 now wait for the starting time ZS, which in the case at hand is assumed to come 2 seconds before the first time slot cycle Z1 ends (absolute time stamp 13 seconds in the first time slot cycle). The search for the seventeenth tag T17 whose position is unknown begins at this starting point ZS.

At the starting point ZS, the tags T1-T6, T10-T12, T16 and T18 whose position is known have activated the search mode, and the tag T17 whose position is unknown has activated the locating mode. Shortly (approx. 200 milliseconds) before the starting point ZS, they exit their sleep state SZ and move into an active state SAZ specific to their respective mode (search mode SM, locating mode OM). Knowing the time slot of the time slot communication method allocated to them in the normal mode and the starting point ZS received beforehand, the affected tags Tn calculate the wakeup moment themselves.

In the specific active state SAZ, the tags T1-T6, T10-T12, T16 and T18 whose position is known transmit their fifty locating signals at random times they themselves defined during the locating signal reception duration OED of three seconds. As a consequence, when the locating signal OS arises is randomly distributed within the locating signal reception duration OED.

Figure 6:
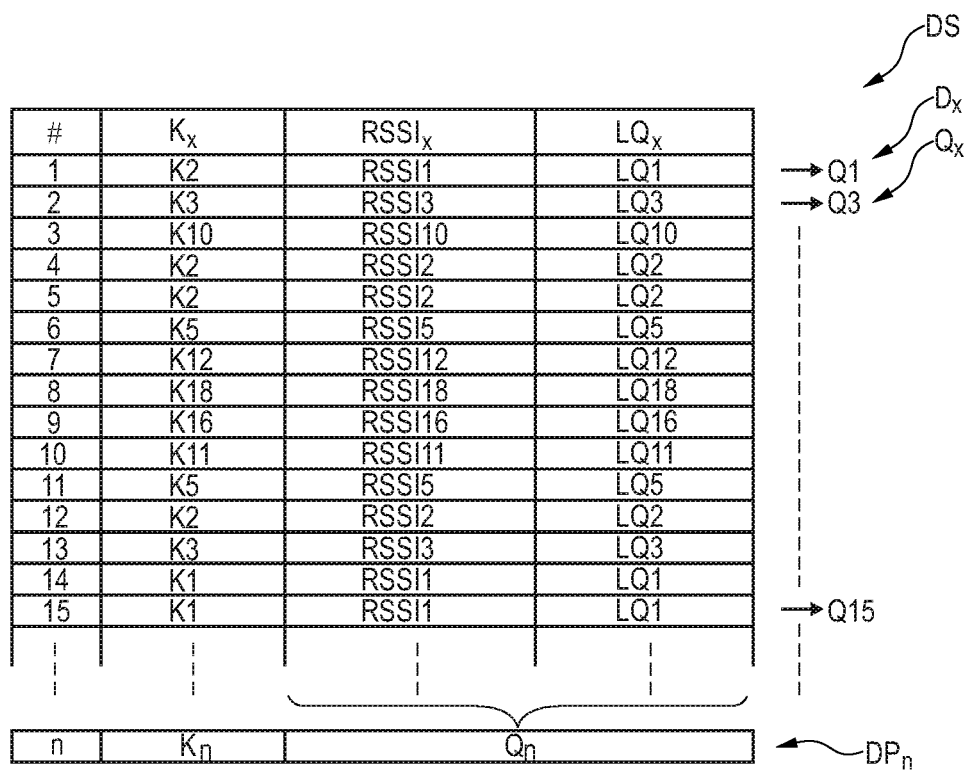
FIG. 6 is a data structure according to a second exemplary embodiment for locating a radio tag.

In the specific active state SAZ, the tag T17 whose position is unknown is permanently on reception, and, provided no collisions between signals are present, it receives a series of locating signals OS transmitted by the tags Tx whose position is known, evaluates the latter with respect to the reception quality Qx and identifier Kx of the respectively transmitting tags Tx whose position is known, and stores the respective data pair Dx. Several data pairs Dx allocated to a specific tag Tx can here also be stored, as depicted on FIG. 6. Recorded on FIG. 6 for the first fifteen of a series of reception events (first column labeled #numbers the reception events) are the identifiers Kx of the transmitting tag Tx, as well as the value of the accompanying received signal strength indicator RSSIx and the value of the link quality LQx values.

Upon expiration of the locating signal reception duration OED, all participating tags T1-T18 return to the sleep state SZ again, which for reasons of clarity is only visualized for the first tag T1 on FIG. 5. They wake up from this sleep state SZ in a timely manner, e.g., 1 second before the appearance of the next time slot to which the respective tag Tn is allocated. This is denoted on FIG. 5 by a lengthened duration of the active state for each of the tags Tn by comparison to the first time slot cycle Z1. Since the tags Tn have been informed about all parameters of the time slot communication method and about their exit from the timing of the time slot communication method, the tags Tn participating in the search independently calculate their wakeup times (see formula 1 in the general portion of the specification). After waking up, they remain in the active state AZ and listen for the signals of the access point X1, until they receive the synchronization signal structure intended for them and reenter the synchronous state (also referred to as re-synchronize). Following their re-synchronization (i.e., reentry into the time slot communication method), the tags Tn that previously participated in the search are again available in the time slot communication method for communicating with the access point X1. As depicted on FIG. 5 in the third or fourth time slot cycles Z3 and Z4, the duration of their active state AZ following re-synchronization is now as long as it was in the first time slot cycle Z1, before the search was performed for the tag T17 whose position is unknown.

This embodiment of the invention is relatively energy efficient, since all of the tags Tn participating in the search are together only active in their specific active state SAZ during a limited timespan, and remain in the sleep state SZ before and after. System efficiency is also hardly influenced by the search, because the search can be confined to a shorter duration (locating signal reception duration OED) by comparison to the duration of a time slot cycle, after which all tags Tn participating in the search independently reenter the time slot communication method again as quickly as possible.

In another exemplary embodiment, the starting time ZS can also coincide directly with the time slot, which directly follows the time slot in which the command SB or OB is delivered to the last tag to participate in the search (here tag T18). In this case, there is no need for the affected tag (here T18) to reenter the sleep state after receiving the command. It can switch directly into the respective mode (search mode or locating mode). In addition, the locating signal reception duration OED can be dimensioned in such a way that the search already concludes within the first time slot cycle Z1. In this case, re-synchronization can already be started at the beginning of the second time slot cycle Z2. It can be especially advantageous for the end of the locating signal reception duration to coincide with the end of the first time slot cycle Z1. In this case as well, those tags Tn participating in the search whose time slot lies in proximity to or at the start of the time slot cycle Z2 do not absolutely have to enter the sleep state SZ. All of these variants help to accelerate the search, and also contribute to system efficiency and energy savings.

In another implementation, the tags participating in the search (but even all tags not participating therein which are allocated to the same access point as the tags participating in the search) switch to the sleep mode in each instance after the locating signal reception duration OED has expired, and only wake up shortly before the appearance of the respective time slot to which they are allocated in the next or next plus one time slot cycle (as measured upon expiration of the locating signal reception duration OED). They can also wake up collectively at a point in time defined in advance, e.g., after expiration of the locating signal reception duration OED at the start of the next time slot cycle, and thereafter wait in the active state for the appearance of the time slot to which they are allocated, so as to re-synchronize themselves with the latter.

Figure 7:
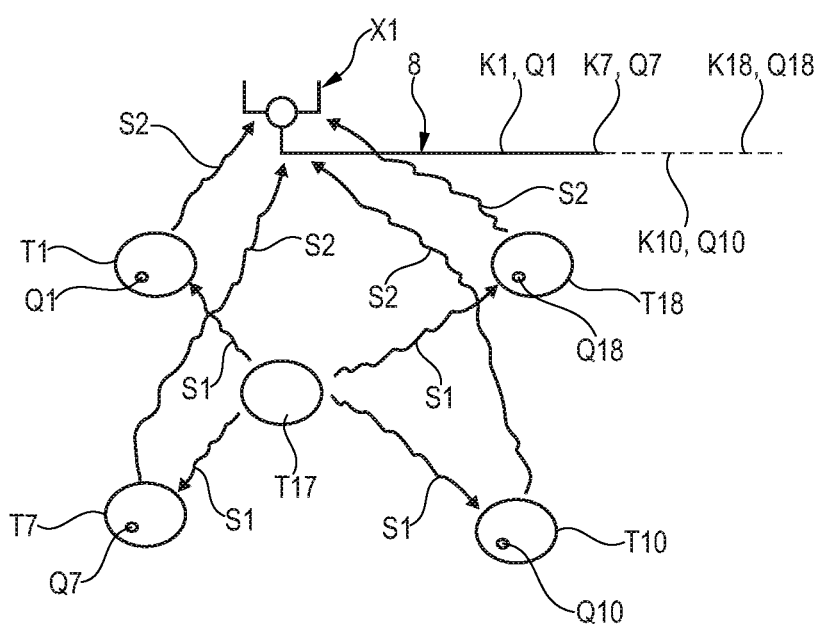
FIG. 7 is a first application of the invention.
Figure 8:
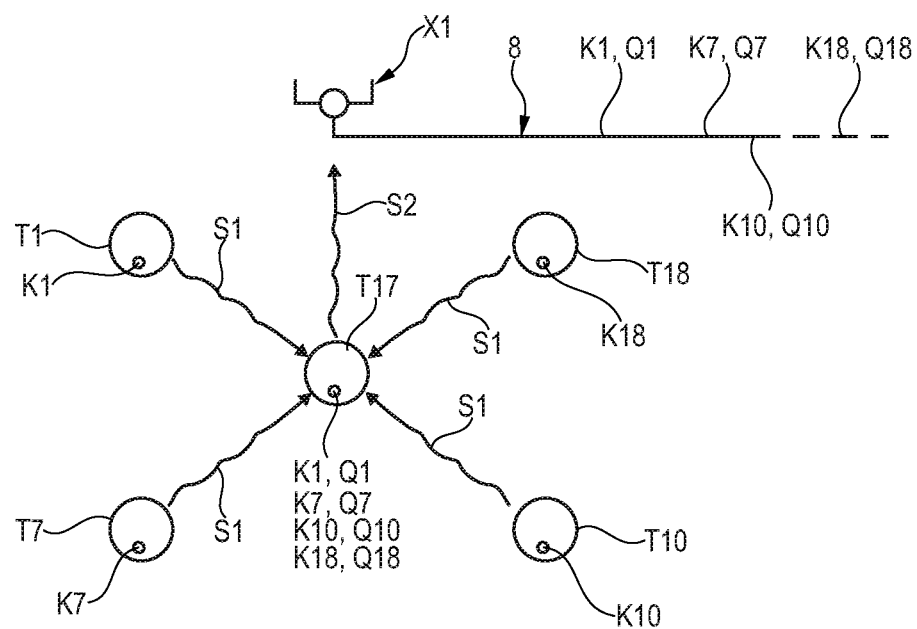
FIG. 8 is a second application of the invention.
Figure 9:
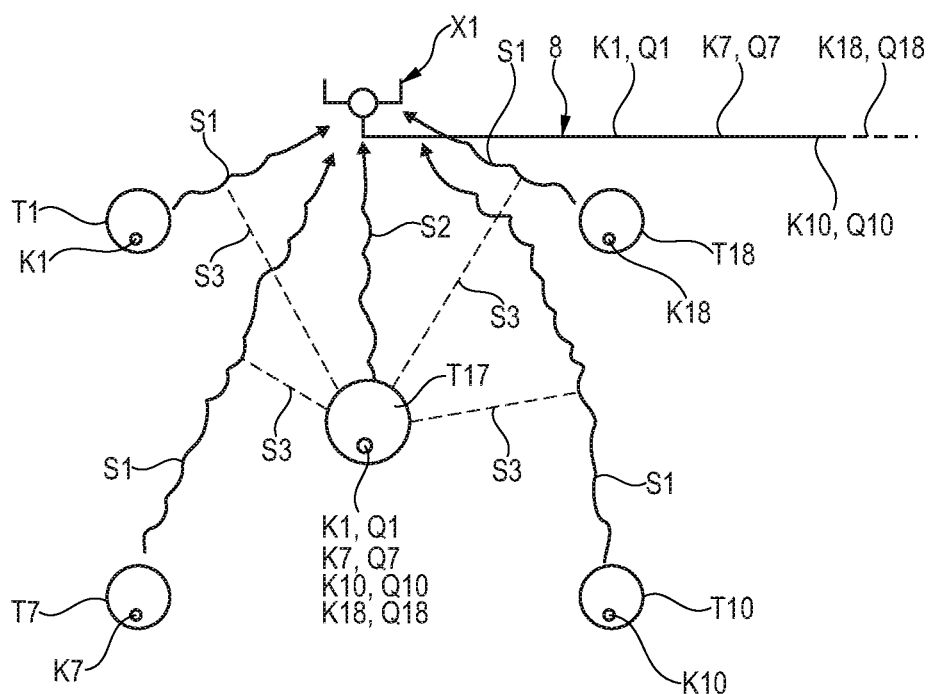
FIG. 9 is a third application of the invention.

The following three FIGS. 7 to 9 summarize three applications of the invention in a highly schematized manner. The number of radio tags Tn participating in the search was reduced to a respective five for reasons of clarity, wherein the seventeenth radio tag T17 assumes the role of a radio tag whose position is unknown, and the other radio tags T1, T7, T10 and T18, or T1-18 for short, assume the role of radio tags whose position is known.

In the first application according to FIG. 7, the access point X1 is used within the framework of a communication according to the time slot communication method to move the radio tag T17 whose position is unknown from the normal mode to the search mode, and the other radio tags T1-18 whose position is known from the normal mode to the locating mode. All involved radio tags T1-18, T17 then wait for the locating signal reception duration OED to start. The tag T17 whose position is unknown transmits one or more locating signals On in the locating signal reception duration OED, as denoted by arrows marked with reference number S1. The radio tags T1-18 whose position is known receive the locating signals On and evaluate them with respect to reception quality Qn (Q1, Q7, Q18, Q10). After the locating signal reception duration OED has expired and all radio tags T1-18 have been re-synchronized with the time slot communication method, the reception quality Qn determined at the respective radio tag T1-18 whose position is known is transmitted to the access point X1, as denoted by arrows marked with reference number S2, wherein the access point X1 knows the respective radio tag T1-18 whose position is known or its identifier Kn (K1, K7, K10, K18). The access point X1 subsequently takes the reception quality Qn obtained by the respective radio tag T1-18 along with the identifier Kn known to it of the respective radio tag T1-18 whose position is known and relays them to evaluation.

In the second application according to FIG. 8, the access point X1 was used within the framework of a communication according to the time slot communication method to move the radio tag T17 whose position is unknown from the normal mode to the locating mode, and the other radio tags T1-18 whose position is known from the normal mode to the search mode. All involved radio tags T1-18, T17 then wait for the locating signal reception duration OED to start. The radio tags T1-18 whose position is known each transmit their locating signal On to the radio tag T17 whose position is unknown in the locating signal reception duration OED, as denoted by arrows marked with reference number S1. The respective locating signal On is received at the radio tag T17 whose position is unknown and evaluated. As a result of the evaluation, the radio tag T17 whose position is unknown stores data pairs comprised of the identifier Kn of the respective radio tag T1-T18 and reception quality Qn. After the locating signal reception duration OED has expired and all radio tags T1-18 have been re-synchronized with the time slot communication method, the data pairs are transmitted to the access point X1, as denoted by the arrow marked with reference number S2, and from there relayed to evaluation.

As opposed to the second application, the locating signals On transmitted in the locating signal reception duration OED are in the third application according to FIG. 9 addressed to the access point X1, while the radio tag whose position is unknown receives the locating signals On, which is denoted by the reference number S3 between the radio tag T17 whose position is unknown and the respective arrow S1, and evaluates them. The determined and stored data pairs DP are transmitted to the access point X1 from the radio tag T17 whose position is unknown, and from there relayed to the data processing device.

Let it be mentioned that the locating signals On that were described as always addressed in the three applications discussed above can also be used without being addressed.

Finally, let it be noted once again that the figures described in detail above are only exemplary embodiments, which the expert can modify in a wide variety of ways without departing from the area of the invention. For the sake of completeness, let it further be noted that the use of indeterminate articles "a" or "an" does not rule out that the features in question can also be repeatedly present. Individually disclosed features can also be combined with other features, without deviating from the concept of the invention.

The invention claimed is:

1. A method for locating a radio tag (T17) whose position is unknown, wherein, in a group of radio tags (T1-T18) that are allocated by radio to only a single access point, a locating signal (On):
   a) is either transmitted by one or more radio tags (T1-T6, T10-T12, T16, T18) whose position is known and received by the radio tag (T17) whose position is unknown;
   b) or transmitted by the radio tag whose position is unknown (T17) and received by one or more radio tags (T1-T6, T10-T12, T16, T18) whose position is known;
   and, in both cases a) and b), the reception quality (Qn) of the locating signal (On) is determined and provided at the radio tag (T1-T6, T10-T12, T16, T18; T17) receiving the locating signal (On) in order to narrow down the position of the radio tag (T17) whose position is unknown;

wherein the radio tag (T17) whose position is unknown comprise a sensor for emitting a sensor signal indicating that the radio tag (T17) was removed from another object, in particular a shelf, and wherein a logic stage of the radio Tag (T17) is designed to emit a status message over a radio communication stage of the radio tag (T17) if the sensor signal is present, wherein the status message represents the detected removal from the other object; and wherein the radio tag (T17) whose position is unknown starts the method for locating its own position automatically.

2. The method according to claim 1, wherein
the tags (T1-T18) communicate with an access point in a normal mode using a time slot communication method, wherein, according to this time slot communication method, a defined number of time slots is available in a defined time unit, and one or more tags are allocated to one of the time slots, and each tag can be individually addressed in its time slot, so as to receive data or commands from the access point and/or transmit data to the access point, wherein
the status message is communicated to the access point to which the tag is allocated in the next time slot allocated to the tag, and the process for locating the radio tag whose position is unknown is started there autonomously or after coordination with the server responsible for managing the system.

3. The method according to claim 1, wherein
the sensor is realized using a stylus (pin), whose penetration depth into a housing of the radio tag (T17) is automatically determined, in particular with a contact that is either closed or open.

4. The method according to claim 1, wherein
the sensor detects the loss of contact with the object in a capacitive or inductive manner.

5. The method according to claim 1, wherein
the appearance of the sensor signal is mechanically or electronically stored in the radio tag (T17) whose position is unknown.

6. The method according to claim 1, wherein
the sensor signal is used to proactively wake up the radio tag (T17) whose position is unknown.

7. The method according to claim 1, wherein
the relative field strength of the locating signal is determined and serves as a gauge for the reception quality, in particular a quality of the data transmission is determined and also considered in the determining of the reception quality.

8. The method according to claim 1, wherein
the radio tag (Tn) whose position is known and that receives the locating signal (On) transmits the evaluated reception quality (Qn) to a data processing device (5), and the data processing device (5) narrows down the position of the radio tag (T17) whose position is unknown, knowing the position of the radio tag(s) (T1-T6, T10-T12, T16, T18) whose position is known and taking into account the reception quality (Qn) received by the respective radio tag (T1-T6, T10-T12, T16, T18) whose position is known.

9. The method according to claim 1, wherein
the radio tag (T1-T6, T10-T12, T16, T18) whose position is known that transmits the locating signal (On) transmits the locating signal (On) along with its identifier (Kn), and wherein
the radio tag (T17) whose position is unknown that receives the locating signal (On) revaluates the locating signal (On) with respect to the identifier (Kn) transmitted along with the locating signal (On), and provides a data pair (Dn) comprised of the identifier (Kn) and accompanying reception quality (Qn).

10. The method according to claim 9, wherein the radio tag (T17) whose position is known and that receives the locating signal (On) transmits the data pair (Dn) to a data processing device (5), and the data processing device (5) narrows down the position of the radio tag (T17) whose position is unknown, knowing the position of the radio tag(s) (T1-T6, T10-T12, T16, T18) whose position is known and taking into account the data pair (Dn) received by the respective radio tag (T17) whose position is unknown.

11. The method according to claim 1, wherein the tag (Tn) intended for transmitting the locating signal (On), in particular the tag (T1-T6, T10-T12, T16, T18) whose position is known, is switched from its normal mode into a search mode by a received search command, wherein the locating signal (On) and/or the time for transmitting the locating signal (On) and/or the frequency of transmitting the locating signal (On) is determined in the search mode.

12. The method according to claim 1, wherein the tag (Tn) intended for receiving the locating signal (On), in particular the tag (T17) whose position is unknown, is switched by a received locating command from its normal mode into a locating mode, wherein a reception readiness for receiving locating signals (On) exists in the locating mode for a locating signal reception duration (OED).

13. The method according to claim 12, wherein
the locating signal reception duration (OED) is designed so that all radio tags (T1-T6, T10-T12, T16, T18) whose position is known and that are involved in the search for the radio tag (T17) whose position is unknown can transmit their locating signal (On) at least one time within the locating signal reception duration (OED), but preferably several times.

14. The method according to claim 12, wherein
the radio tag (Tn) intended for receiving the locating signal (On), in particular the radio tag (T17) whose position is unknown, stores the data pair (Dn) for each locating signal (On) received during the locating signal reception duration (OED) for later use.

15. The method according to claim 14, wherein
the radio tag (Tn) intended for receiving the locating signal, in particular the radio tag (T17) whose position is unknown, only transmits one or more stored data pairs (Dn) after the locating signal reception duration (OED) has expired.

16. The method according to claim 1, wherein the radio tag (T17) whose position is unknown exhibits an indicating device, wherein the latter is used to visualize status information, which represents its internal or system-wide status as a radio tag whose position is unknown that is to be located.

17. The method according to claim 1, wherein a calibration communication with an access point (X1, X2) whose position is known is performed with the radio tags (Tn), wherein the reception quality (Qn) is determined for each involved radio tag (Tn), and a correlation is defined between the determined reception quality (Qn) and the position for the respective radio tag (Tn) whose position is known.

18. The method according to claim 1, wherein the tags (T1-T18) communicate with an access point in a normal mode using a time slot communication method, wherein, according to this time slot communication method, a defined number of time slots is available in a defined time unit, and one or more tags are allocated to one of the time slots, and each tag can be individually addressed in its time slot, so as to receive data or commands from the access point and/or transmit data to the access point, wherein the tag (T17) whose position is unknown and/or at least one tag (T1-T6, T10-T12, T16, T18) whose position is known exit(s) the time slot communication method so as to transmit or receive the locating signal (On).

19. The method according to claim 18, wherein, after the locating signal (On) has been transmitted or received, the affected radio tags (Tn) again join the time slot communication method, and return to the normal mode.

\* \* \* \* \*